United States Patent [19]

Saito

[11] 4,363,046
[45] Dec. 7, 1982

[54] DEFLECTABLE TRANSDUCER HEAD ASSEMBLY

[75] Inventor: Etsuro Saito, Ayase, Japan

[73] Assignee: Sony Corporation, Tokyo, Japan

[21] Appl. No.: 205,742

[22] Filed: Nov. 10, 1980

[30] Foreign Application Priority Data

May 24, 1980 [JP] Japan .................................. 55-69118

[51] Int. Cl.³ ...................... G11B 21/10; G11B 21/18; G11B 5/52
[52] U.S. Cl. ...................................... 360/106; 360/77; 360/107
[58] Field of Search .................. 360/106, 109, 77, 70, 360/DIG. 1, 107

[56] References Cited

U.S. PATENT DOCUMENTS 3,995,317 11/1976 Schmidt .............................. 360/107
4,148,082 4/1979 Okada et al. .......................... 360/77
4,151,569 4/1979 Hathaway .
4,212,043 7/1980 Baker .
4,236,185 11/1980 Obremski ............................. 360/77

Primary Examiner—Alfred H. Eddleman
Attorney, Agent, or Firm—Hill, Van Santen, Steadman, Chiara & Simpson

[57] ABSTRACT

A transducer head assembly for a video tape machine capable of supporting the magnetic head so that it can be moved transversely to the tape so that the head will be aligned with the magnetic signal track for different speeds and direction of movement of the tape as well as for situations when the tape is stopped. A pair of flexible supporting means are generally triangular shaped and have their rear edges attached to opposite sides of a supporting block and have their free ends connected to a connecting bar upon which the magnetic head is mounted. A coil is attached to the connecting bar and moves between one or more magnets such that when electrical signals are applied to the coil the connecting bar is moved to align the magnetic head. The spacing between the two flexible members is substantial so that a pantograph is formed which assures that the magnetic head moves substantially parallel to the surface of the tape and does not move in an arc.

17 Claims, 14 Drawing Figures

DEFLECTABLE TRANSDUCER HEAD ASSEMBLY

BACKGROUND OF THE INVENTION

1. Field of the Invention

This invention relates in general to a moveable transducer head assembly for displacing a magnetic head relative to traces recorded on magnetic tape and in particular to an improved transducer head which moves the head substantially in a linear direction rather than in an arc.

2. Description of the Prior Art

It is known to use automatic head tracking systems in video recorders wherein the head is deflected in a controlled manner so that the magnetic head will scan a video tape so as to maintain alignment with the magnetic tracks on the tape at different tape speeds or even when the tape is stopped. Particularly during the so-called special reproduction modes, such as slow, fast, reverse and stop modes it is necessary to move the head relative to the tape to maintain alignment. It has been known in the prior art to use bi-morph leaves which are made of piezoelectric ceramic material to support the head. However, deflection of the bi-morph leaf moves the head not parallel to the surface of the tape but in an arc which destroys the alignment of the head with the tape and also results in substantial reduction in the quality of the reproduced signal.

Disadvantages of the bi-morph supported head is that the bi-morph is subjected to hysteresis loss in response to the driving voltage so when the driving voltage returns to zero the magnetic head does not return to the zero reference position. Furthermore, the head assembly cannot be moved very large distances which are required particularly at high speed modes.

U.S. Pat. No. 4,151,569 discloses in FIG. 10 a head carrying plate which can be controlled with electromagnets so as to cause tracking of the magnetic head. This apparatus however causes the head supporting plate to move in an arc and thus is subject to the disadvantages of prior art bi-morph heads.

SUMMARY OF THE INVENTION

The present invention comprises an improved head assembly for supporting a magnetic head in which two parallel flexible plates are spaced a substantial distance apart and are controlled with a magnetic field so as to move their free ends to which the magnetic head is supported. The two parallel plates form a pantograph such that the head moves substantially in the plane of the tape rather than in an arc so that high fidelity reproduction is obtained as well as alignment and furthermore the head can be moved substantial distances such as required in high speed mode of operation.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

Figure 1:
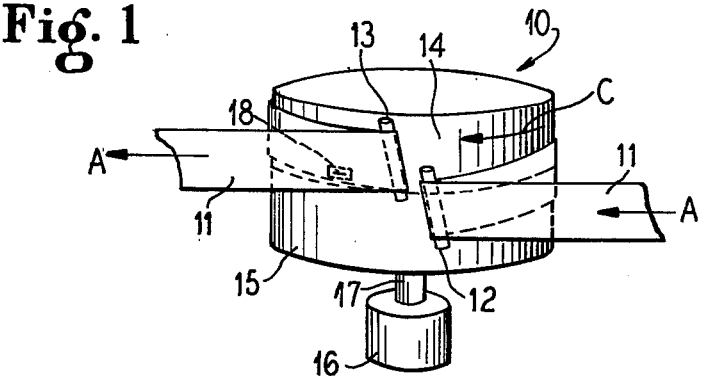
FIG. 1 illustrates magnetic tape passing around a drum during which it is read with a magnetic head.
Figure 2:
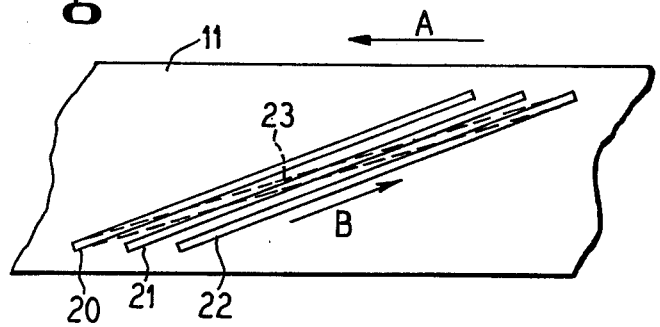
FIG. 2 illustrates a segment of magnetic tape.

FIG. 1 illustrates a portion of a video tape recorder and reader 10 which has a stationary drum 15 and a moveable drum 14 which carries the magnetic head 18 for reading slant tracks 20, 21, 22 as shown in FIG. 2 on tape 11. The tape 11 is mounted on the drum 15 and 14 in the so-called omega manner and passes over guides 12 and 13. A motor 16 has an output shaft 17 which drives the moveable drum 14 in the direction of arrow C.

When the tape 11 is moved in the high speed mode the alignment between the head 18 and the slant tracks 20, 21 and 22 will not be maintained but the head will pass from the tracks 20, 21 and 22 in the path of the dashed line 23 shown in FIG. 2 if the head 18 is merely rotated with the drum 14 and is not moved normal to the circumference of the drum 14. The amount of movement required in high speed mode is very large and the present invention allows large displacements of the head in the axial direction of the drum 14 so as to assure alignment of the head 18 with the slant tracks 20, 21 and 22 and further assures that the magnetic head will substantially remain in contact with the tape rather than moving in an arc which takes it away from the tape so as to deteriorate the reproduction of the magnetic tracks.

Figure 3:
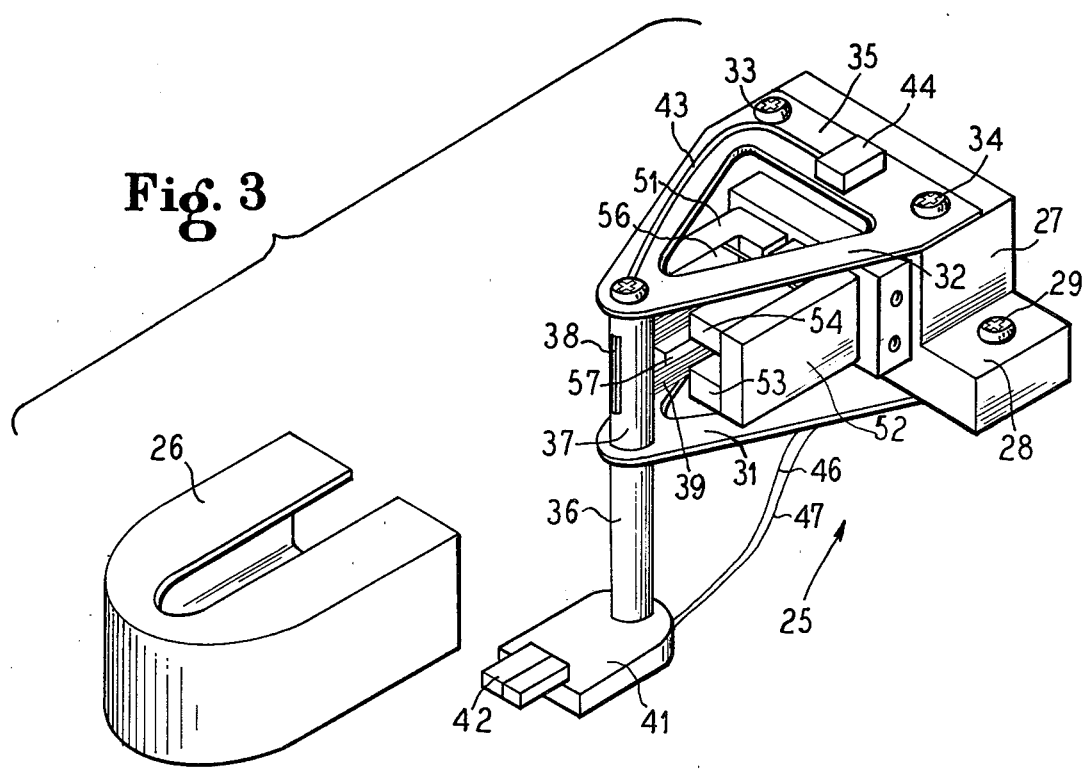
FIG. 3 is a perspective view of the transducer head assembly according to the invention.
Figure 4:
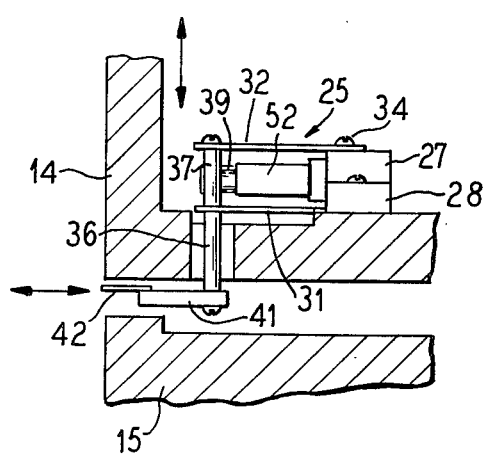
FIG. 4 is a sectional view for illustrating the invention.
Figure 5:
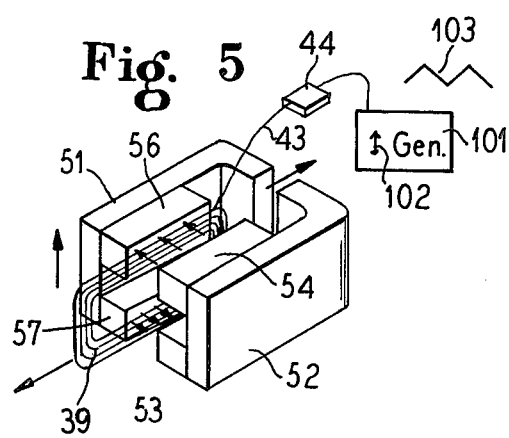
FIG. 5 is a partial perspective view of the invention.

FIGS. 3 through 5 illustrate the first embodiment of the invention. A base block 27 is formed with projections 28 at either end thereof through which set screws 29 can be received so as to attach the base plate 27 to the rotating drum 14 to support the head. A pair of triangular shaped plates 31 and 32 formed with central openings of generally triangular shape form are attached to the opposite edges of the block 27 by set screws 33 and 34 and are spaced a substantial distance apart. A connecting bar 36 has a portion 37 attached to the ends of the flexible plates 31 and 32 by a suitable epoxy or other means. The bar 36 may be made of carbon fiber so that it will be very light. A head base 41 is attached to the lower end of the connecting bar 36 and carries the magnetic head 41. Leads 46 and 47 extends from the magnetic head 42 to supply an input or remove an output therefrom in use. A vertical slot 38 is formed in the portion 37 of bar 36 and a magnetic coil 39 is received in the slot 38 and attached thereto with epoxy or other suitable means such that the plane of the coil 39 lies substantially in the vertical plane and extends back toward the block 27 as illustrated. Yoke members 51 and 52 are attached to the block 27 and are of generally L-shape and carry permanent magnets 53, 54, 56 and 57 on their inner surfaces so as to provide magnetic fields which passes through the coil 39. One side of the coil 39 may be connected to leads 43 which connect to a connector block 44 mounted on block 27 so as to apply input to the coil.

A cover plate 26 for magnetic shielding is receivable over the members 31 and 32 and can be attached to the member 27 by suitable set screws. The magnetic head 42 extends down below the shield cover 26 and the shield cover 26 prevents the magnetic field from the coil 39 from interfering and distorting the signal picked up by the magnetic head 42.

The plates 31 and 32 may be made of beryllium copper for example.

FIG. 4 is a sectional view illustrating the orientation of the magnetic head 42 relative to the rotating drum 14 and the stationary drum 15 over which the magnetic tape passes. FIG. 5 is a perspective view showing the coil 39, the magnets 53, 54, 56 and 57 and the signal generator 101 which is connected to the coil 39 to supply a suitable electrical signal 103 as a function of the setting of the speed switch 102. The plates 31 and 32 are very thin so that they can flex in the vertical direction to move the head 42 in response to electrical signals applied to the coil 39. If, for example, relative to FIG. 5, the magnets 54 and 57 are north poles and the magnets 53 and 56 are south poles and if current is passing through the coil 39 in the clockwise direction relative to FIG. 5 then according to the Fleming lefthand rule, the coil 39 will move upwardly relative to FIG. 5 thus moving the magnetic head upwardly. On the other hand, if the current through the coil 39 is reversed so that it flows counterclockwise relative to FIG. 5, then the coil 39 will be moved downwardly by the magnetic force and the magnetic head will move downwardly.

Although four permanent magnets are illustrated if stronger magnets are used the apparatus will operate with only two permanent magnets.

Figure 6:
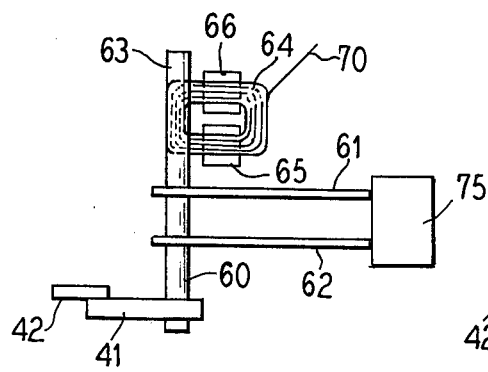
FIG. 6 illustrates a modified form of the invention.

FIG. 6 illustrates a modification of the invention where the coil has been mounted to an upper extending portion 63 of a connecting bar 60 which carries the magnetic head 42 and the coil 64 extends outwardly and is mounted between permanent magnets 66 and 65 such that when current is passed through lead 70 of the coil the connecting bar 60 will be moved upwardly and downwardly to move the head 42. A pair of flexible plates 61 and 62 similar to the plates 31 and 32 are spaced a substantial distance apart and are attached at their rear end to a suitable holding block 75 such that as the connecting bar 60 is moved by the coil 64 the head 42 will be moved substantially in the vertical plane rather than in an arc so as to maintain good orientation with the magnetic tape.

Figure 7:
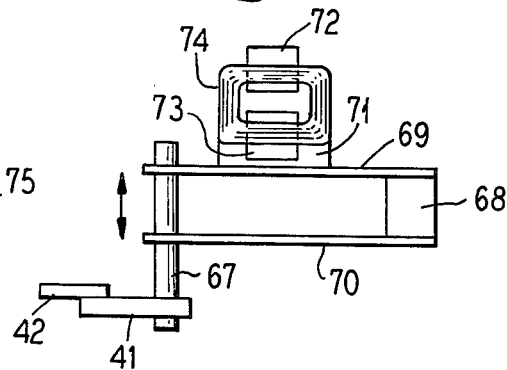
FIG. 7 illustrates a further modification of the invention.

FIG. 7 is a further embodiment of the invention in which a pair of flexible triangular-shaped plates 69 and 70 similar to plates 31 and 32 are attached to a supporting member 68 and carry a connecting bar 67 upon which the head 42 is supported for vertical movement. The moving coil 74 is attached by means of a bracket 71 to the upper plates 69 and moves between the magnets 72 and 73 in response to current applied to the coil 74.

Figure 8:
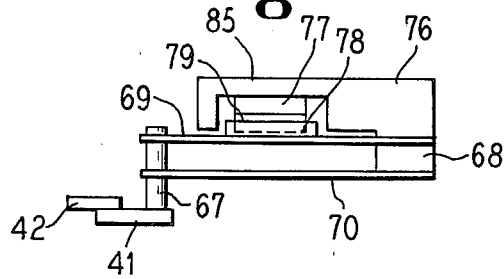
FIG. 8 illustrates an additional modification of the invention.
Figure 9:
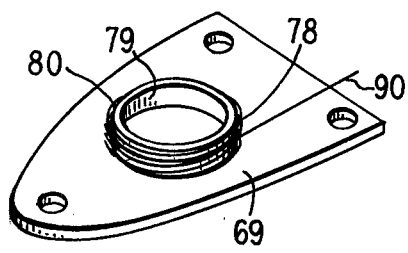
FIG. 9 illustrates in detail the supporting plate of the embodiment of FIG. 8.

Another embodiment is illustrated in FIGS. 8 and 9. A block 68 supports on opposite sides thereof the flexible plates 69 and 70 with the connecting bar 67 at the free end thereof which supports the magnetic head 42 and a cylindrical shaped coil 78 is mounted on a core 80 which is attached to the upper plate 69 as illustrated in FIG. 9 and the core 80 is formed with a central opening 79. A magnetic yoke means 76 has a portion 85 which extends over the coil 78 and carries a permanent magnet 77 which extends down into the opening 79 of the core 80 such that when current is applied to the leads 90 of the coil 78 the plates 69, 70, connecting bar and magnetic head 42 will be moved upwardly and downwardly in response to the field applied to the coil 78.

In all of the embodiments illustrated, the flexible plates which support the connecting bar are spaced at relatively large distances apart so as to form a pantograph such that the magnetic head 42 moves substantially vertically so that its orientation relative to the magnetic tape is maintained so as to provide good reproducibility. Also, in all of the embodiments, large movement of the magnetic head can occur which is required for good reproducibility with modes other than the standard reproduction and recording speed of the tape. Also, the invention is not subjected to hysteresis which is present in prior art devices which results in the head not returning to the zero reference position in the absence of a displacement signal.

FIGS. 10 through 14 illustrate different embodiments for the supporting plates. The fact that the plates are triangular in shape prevents the plates from being subjected to torsion when actuated and results in a vertical movement of the free ends during operation.

Figure 10:
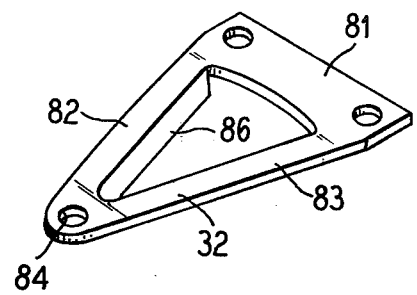
FIG. 10 illustrates a form of the supporting plates of the invention.
Figure 11:
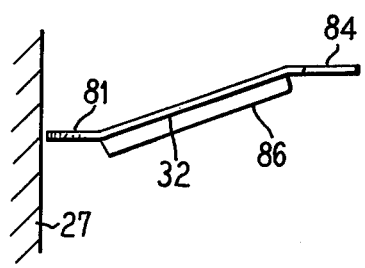
FIG. 11 is a side view of the supporting plate of the invention.

As shown in FIG. 10, the plates 31 and 32 may have the inner edges of the triangular opening reinforced with ribs 86 which extend along the two longer sides of the opening so as to make the legs 82 and 83 of the plate 32 stiffer than the base portion 81 and the end portion 84 which carries the connecting bar and magnetic head. FIG. 11 for example illustrates the manner in which the plate 32 illustrated in FIG. 10 would bend due to the reinforcing ribs 86 such that the bend occurs in the portions 81 and 84.

Figure 12:
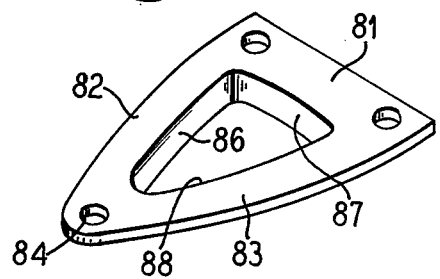
FIG. 12 illustrates in modified form of the supporting plate of the invention.

FIG. 12 illustrates another embodiment of the invention wherein a flexible plate 83 with a base 81 and an end 84 has legs 82 and the central triangular opening is surrounded by ribs 86, 87 and 88 which join together so as to make the central portion more rigid so that bending will occur in the portions 81 and 84 as illustrated in FIG. 11.

Figure 13:
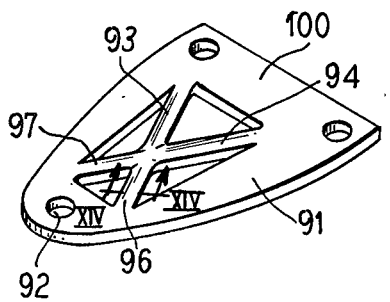
FIG. 13 illustrates a modified form of a supporting plate of the invention.
Figure 14:
FIG. 14 is a sectional view through a leg of the supporting plate of the invention.

FIG. 13 illustrates a further embodiment of the connecting and supporting plates wherein a planar member 91 is formed with four triangular openings so as to form legs 93, 94 and 96 and 97 which meet in the center between the base portion 100 and the end portion 92. A section through a leg 96 is illustrated in FIG. 14 and is curved so as to give added strength to the central portion of the plate 91.

In all of the embodiments, the head supporting structure such as the connecting bar is made of very light material so that small inertia will be present in the moving parts. Also, the plates 31 nd 32 are made to be light so that they can be moved very rapidly and substantial distances. In an example, according to the invention, the plates 31 and 32 were about 1⅜ inches in length with the base being about ⅜ inches in width and the spacing between the upper and lower plates 31 and 32 was ⅜ of an inch. With such structure, the magnetic head could be caused to move a quarter of an inch for example in a vertical plane.

Although the invention has been described with respect to preferred embodiments, it is not to be so limited as changes and modifications can be made therein which are within the full intended scope as defined by the appended claims.

I claim as my invention:

1. A deflectable transducer head assembly comprising:
   (a) a transducer means for transducing signals;
   (b) a base member;
   (c) a pair of deflectable members spaced apart and mounted with first ends attached to said base member and extending parallel to each other and with second ends remote from said first ends and moveable together;
   (d) means connecting said second ends of said deflectable members together;
   (e) a moving coil mounted to move with said deflectable members in response to a control signal applied thereto;
   (f) magnetic means mounted adjacent said moving coil for supplying a magnetic flux thereto; and
   (g) said transducer means mounted on said connecting means and displaced in a predetermined direction to trace a signal track accurately in response to movement of said moving coil means relatively to said magnetic means.

2. A deflectable transducer head assembly according to claim 1 wherein said transducer means is connected to said connecting means.

3. A deflectable transducer head assembly according to claim 1 wherein said moving coil is connected to one of said deflectable means.

4. A deflectable transducer head assembly according to claim 1 wherein said moving coil means is connected to said connecting means.

5. A deflectable transducer head assembly according to claim 1 wherein said transducer means is connected to one of said deflectable means.

6. A deflectable transducer head assembly according to claim 1 wherein at least one of said deflectable member has a substantially triangular shape.

7. A deflectable transducer head assembly according to claim 6 wherein said one deflectable member has a triangular hole formed therein, a rib extending into said hole on at least one edge of said hole.

8. A deflectable transducer according to claim 7 wherein ribs extend into said hole on at least two edges of said hole.

9. A deflectable transducer according to claim 7 wherein ribs extend into said hole on all three sides thereof.

10. A deflectable transducer according to claim 6 wherein said one deflectable member is formed with a plurality of openings.

11. A deflectable transducer according to claim 10 wherein a plurality of arms separate said plurality of openings.

12. A deflectable transducer according to claim 11 wherein said arms are arcuate shaped in cross-section.

13. A deflectable transducer according to claim 3 wherein at least one of said deflectable members is formed with a round opening and said moving coil is round and is connected to said deflectable member about said round opening and said magnetic means is cylindrical shaped and is moveable into said opening and said coil.

14. A deflectable transducer according to claim 1 wherein said deflectable members are spaced a substantial distance apart.

15. A deflectable transducer according to claim 4 wherein said moving coil is planar and is mounted in a slot formed in said connecting means.

16. A deflectable transducer according to claim 15 comprising magnetic yoke means connected to said base means and said magnetic means connected to said magnetic yoke means.

17. A deflectable transducer according to claim 1 comprising a magnetic shield means attached to said base member to shield said transducer means from said magnetic means and said moving coil.

* * * * *